United States Patent [19]

Goetz et al.

[11] Patent Number: 4,767,841

[45] Date of Patent: Aug. 30, 1988

[54] ARYLENE SULFIDE POLYMER PREPARATION FROM DEHYDRATED ADMIXTURE COMPRISING SULFUR SOURCE, CYCLIC AMIDE SOLVENT AND WATER

[76] Inventors: Kenneth D. Goetz; Afif M. Nesheiwat, both of Bartlesville, Okla.; Guy Senatore, Borger, Tex.; Wei-Teh W. Shang, Bartlesville, Okla.;

[73] Assignee: Phillips Petroleum Company, Bartlesville, Okla.

[21] Appl. No.: 17,949

[22] Filed: Feb. 24, 1987

[51] Int. Cl.$^4$ ............................................. C08G 75/14
[52] U.S. Cl. ..................................................... 528/388
[58] Field of Search ........................................ 528/388

[56] References Cited

U.S. PATENT DOCUMENTS

| | | |
|---|---|---|
| 3,354,129 | 11/1967 | Edmonds, Jr. et al. ............... 260/79 |
| 3,790,536 | 2/1974 | Vidaurri, Jr. ....................... 260/79.1 |
| 3,876,591 | 4/1975 | Campbell ............................ 260/79.1 |
| 4,337,182 | 6/1982 | Needham ............................. 524/609 |
| 4,482,665 | 11/1984 | Dix ....................................... 524/262 |
| 4,663,430 | 5/1987 | Ostlinning et al. ................. 528/388 |

Primary Examiner—Harold D. Anderson
Attorney, Agent, or Firm—J. D. Brown

[57] ABSTRACT

Arylene sulfide polymer having a high extrusion rate, e.g. at least about 100 g/10 min. are prepared by a process comprising: (a) dehydrating an aqueous admixture of a suitable sulfur source and a cyclic organic amide; (b) admixing a dihalo-substituted aromatic compound with the dehydrate mixture to form a polymerization mixture wherein the molar ratio of sulfur source to the cyclic organic amide is about 0.39:1 to about 0.6:1; (c) subjecting the polymerization mixture to reaction conditions sufficient to produce the arylene sulfide polymer; and (d) recovering the arylene sulfide polymer.

12 Claims, No Drawings

ARYLENE SULFIDE POLYMER PREPARATION FROM DEHYDRATED ADMIXTURE COMPRISING SULFUR SOURCE, CYCLIC AMIDE SOLVENT AND WATER

FIELD OF THE INVENTION

This invention relates to processes for the production of polymers from aromatic compounds. In one aspect, this invention relates to processes for the production of arylene sulfide polymers. In another aspect, this invention relates to processes for the production of poly(phenylene sulfide) having a high extrusion rate.

BACKGROUND OF THE INVENTION

A basic process for the production of arylene sulfide polymers from polyhalo-substituted aromatic compounds by reaction with an alkali metal sulfide in a polar organic solvent is disclosed in U.S. Pat. No. 3,354,129. This patent also discloses that the molecular weight of the arylene sulfide polymers can be reduced by the use of monohalo-substituted aromatic compounds as chain terminating agents or by the use of an excess of one of the reactants in the polymerization reaction mixture such as p-dichlorobenzene. While such methods do provide means of reducing the molecular weight of arylene sulfide polymers produced according to the teachings of U.S. Pat. No. 3,354,129, other methods of obtaining reduced molecular weight arylene sulfide polymers are desired which do not suffer from the disadvantages of the increased cost of added reactant materials or the need for recovering and recycling excess reactant materials to the polymerization zone.

Arylene sulfide polymers can be characterized at least in part in terms of a melt flow rate. It is generally considered that a melt flow rate is inversely related to molecular weight for polymeric materials in general and for arylene sulfide polymers in particular. Extrusion rate, which is more specifically defined hereinafter, is a specific type of melt flow rate which is particularly useful for characterizing arylene sulfide polymers in the lower molecular weight range. Arylene sulfide polymers having a relatively high extrusion rate are desirable for a variety of applications especially in the field of encapsulation of electronic components. For example, U.S. Pat. Nos. 4,337,182 and 4,482,665 provide exemplary disclosures of compositions comprising arylene sulfide polymers which are employed in the encapsulation of electronic components.

It is therefore an object of this invention to provide a method for producing poly(arylene sulfide) having a high extrusion rate in a readily controllable manner. It is another object of this invention to provide a method for producing poly(arylene sulfide) having a high extrusion rate by adjustment of a reactant concentration in the polymerization reaction mixture. It is another object of this invention to provide a method for producing poly(arylene sulfide) having an extrusion rate of at least about 100 grams/10 minutes.

BRIEF STATEMENT OF THE INVENTION

According to this invention, a process for preparing arylene sulfide polymers having an extrusion rate of at least about 100 grams/10 minutes is provided wherein the molar ratio of sulfur source to cyclic organic amide in the polymerization reaction mixture is within the range of about 0.39:1 to about 0.6:1.

DETAILED DESCRIPTION

It has been discovered that a process for preparing arylene sulfide polymers having an extrusion rate of at least about 100 grams/10 minutes can be provided by employing the steps of: (a) dehydrating an aqueous admixture comprising at least one sulfur source and at least one cyclic organic amide to form a dehydrated admixture; (b) admixing at least one dihalo-substituted aromatic compound with the dehydrated admixture from step (a) to produce a polymerization mixture wherein the molar ratio of sulfur source to said cyclic organic amide is about 0.39:1 to about 0.6:1; and (c) subjecting said polymerization mixture to polymerization conditions effective to produce products comprising said arylene sulfide polymer. Thus a simple means of obtaining high extrusion rate arylene sulfide polymers is provided which does not suffer the disadvantages of requiring added chain terminating agents or recovery and recycle of excess reactant. The arylene sulfide polymers having a high extrusion rate made according to this invention are readily recoverable and well suited for use in applications where such high extrusion rate arylene sulfide polymers are desired, e.g. encapsulation of electronic components.

As used throughout the specification and claims, the term extrusion rate refers to a flow rate measurement on molten polymer based on ASTM D1238, Procedure B—Automatically Timed Flow Rate Measurement, made at 600° F., using a total driving mass of 345 grams and an orifice having the dimensions of 0.0825±0.0002 inch diameter and 1.250±0.002 inch length. As previously discussed, extrusion rate is a specific type of melt flow measurement which is particularly useful in characterizing arylene sulfide polymers in the lower molecular weight range.

The dihalo-substituted aromatic compounds which are employed according to this invention are compounds having 6 to about 22 carbon atoms per molecule. The halogen substituent on the dihalo-substituted aromatic compound can be selected from the group consisting of chlorine, bromine, and iodine. Preferably, the dihalo-substituted aromatic compounds will be dihalo-substituted benzenes and more preferably dichloro-substituted benzenes. Particularly good results are expected when the dihalo-substituted aromatic compound is selected from the group consisting of p-dichlorobenzene and mixtures of p-dichlorobenzene with a total of about 0 to about 10 mole percent of at least one of m-dichlorobenzene, o-dichlorobenzene, and alkyl-substituted p-dichlorobenzenes having the formula

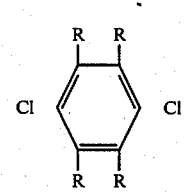

wherein R is H or an alkyl group having 1 to 4 carbon atoms and at least one R is not H.

Examples of some suitable dihalo-substituted aromatic compounds include p-dichlorobenzene, p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1- ethyl-4-isopropyl-2,5-dibromobenzene, 1,2,4,5-tetramethyl-3,6-dichlorobenzene, 1,2,4,5-tetrabutyl-3,6-dichlorobenzene 1-ethyl-3-butyl-2,5-dichlorobenzene, 1-ethyl-2,5-diiodobenzene, 1-butyl-2,5-dichlorobenzene, 1-butyl-4-ethyl-2,5-dibromobenzene, o-dichlorobenzene, m-dichlorobenzene and the like.

The cyclic organic amides used in the process of this invention should be substantially liquid at the reaction temperatures and pressures employed. The cyclic organic amides can have 5 to about 12 carbon atoms per molecule. Examples of some suitable cyclic amides include N,N'-ethylene dipyrrolidone, N-methyl-2-pyrrolidone, pyrrolidone, caprolactam, N-ethyl caprolactam, N-methyl caprolactam and mixtures thereof. N-methyl-2-pyrrolidone is a preferred cyclic amide.

In accordance with this invention, suitable sulfur sources which can be employed in the production of the high extrusion rate arylene sulfide polymers include alkali metal sulfides, alkali metal bisulfides and hydrogen sulfide. Further according to the instant invention the alkali metal sulfides can be employed with good results in the absence of any added alkali metal hydroxide whereas the other suitable sulfur sources are preferably employed in the process of this invention in the presence of an added alkali metal hydroxide. For the alkali metal bisulfides the amount of added alkali metal hydroxide will generally be in the range of from about 0.3:1 to about 4:1 preferably about 0.4:1 to about 2:1 gram moles per gram mole of alkali metal bisulfide. When hydrogen sulfide is employed as the sulfur source the amount of added alkali metal hydroxide is generally within the range of about 1.3:1 to about 5:1 preferably about 1.4:1 to about 3:1 gram moles per gram mole of hydrogen sulfide employed.

Alkali metal hydroxides which can be employed include lithium hydroxide, sodium hydroxide, potassium hydroxide, rubidium hydroxide, and cesium hydroxide. The preferred alkali metal hydroxide is sodium hydroxide.

Suitable alkali metal bisulfides include the bisulfides of lithium, sodium, potassium, rubidium, cesium and mixtures thereof, in anhydrous form or as hydrates. The preferred alkali metal bisulfide is sodium bisulfide.

Also included in the group of suitable sulfur sources are the alkali metal sulfides such as sodium sulfide, potassium sulfide, lithium sulfide, rubidium sulfide, and cesium sulfide. The suitable alkali metal sulfides include the monosulfides in anhydrous and hydrated forms. The preferred alkali metal sulfide is sodium sulfide.

While the ratio of reactants for the preparation of arylene sulfide polymers according to this invention can vary considerably, the ratio of gram-moles of dihalo-substituted aromatic compounds to gram-atoms of divalent sulfur in the sulfur source should be within the range of from about 0.8:1 to about 2:1, and preferably from about 0.95:1 to about 1.3:1.

According to this invention, arylene sulfide polymers having the desired high extrusion rate of at least about 100 grams/10 minutes preferably about 100 to about 1000 grams/10 minutes, are produced by providing an aqueous admixture comprising at least one suitable sulfur source and at least one cyclic organic amide. The aqueous admixture is then subjected to a dehydration step such as by distillation to remove essentially all of the free or uncomplexed water from said admixture. The dehydrated admixture is then admixed with at least one dihalo-substituted aromatic compound to produce a polymerization mixture wherein the molar ratio of sulfur in said sulfur source to said cyclic organic amide is about 0.39:1 to about 0.6:1, preferably about 0.42:1 to about 0.5:1. The polymerization mixture is subjected to polymerization conditions effective to produce the arylene sulfide polymer.

For the purposes of determining the molar ratio of sulfur source to cyclic organic amide in the polymerization mixture for this invention allowance can be made for any losses of these compounds from the initial charge during the dehydration step if desired. Furthermore, any cyclic organic amide added after the dehydration step is taken into account in determining said molar ratio. Finally, all of the cyclic organic amide present, whether added initially or after the dehydration step, and all of the sulfur source present is assumed to be in an uncomplexed or unreacted state when determining said molar ratio in the polymerization mixture.

Suitable polymerization conditions include a reaction temperature which can vary over a wide range but will generally be within the range of from about 235° C. to about 450° C. preferably from about 240° C. to about 350° C. The reaction time will be within the range of from about 10 minutes to about 72 hours and preferably about in 1 hour to about 8 hours. The pressure need be only sufficient to maintain the dihalo-substituted aromatic compound and the cyclic organic amide substantially in the liquid phase, and to substantially retain the sulfur source therein.

Although various known methods can be employed for the recovery of the high extrusion rate arylene sulfide polymer made according to the process of this invention, it is preferred to employ a method wherein the heated reaction mixture is subjected to a pressure reduction to atmospheric pressure which will cause a substantially complete flashing of the cyclic organic amide from the reaction mixture. The flashed reaction mixture residue can be slurried with a liquid diluent such as water in which the alkali metal halides and other impurities are soluble. The liquid diluent is removed with dissolved impurities such as by filtration leaving a particular arylene sulfide polymer. This washing process can be repeated until the desired level of arylene sulfide polymer purity is attained. Another known method that can be employed is the "water quench" process wherein the polymerization reaction mixture is contacted at a temperature above that at which the arylene sulfide polymer is in a molten state with a sufficient amount of a separation agent that is soluble in the cyclic organic amide and is a non solvent for the arylene sulfide polymer, e.g. water, to cause a phase separation of the molten arylene sulfide polymer from the cyclic organic amide. Subsequent cooling of the quenched, phase-separated mixture produces a slurry of particulate arylene sulfide polymer in the cyclic organic amide which can be filtered to recover the particulate arylene sulfide polymer. The separated polymer can be washed as described above.

EXAMPLES

Examples are provided in an effort to assist one skilled in the art to a further understanding of the invention, and yet not be unduly limitative of the reasonable scope of the invention. The particular reactants, conditions, ratios, and the like, are all intended to be illustrative of our invention, and not limitative of the reasonable and suitable scope thereof.

EXAMPLE I

A series of polymerization runs were performed in a two gallon, fast stirring reactor for the preparation of poly(p-phenylene sulfide) (PPS). The polymerization recipe for these runs is presented below.

|  | Compound, g-mole |
| --- | --- |
| N—methyl-2-pyrrolidone (NMP) | 14.29–19.92 |
| Sodium hydroxide (NaOH) | 6.05 |
| Sodium bisulfide (NaSH) | 6.0 |
| p-Dichlorobenzene (p-DCB) | 6.15 |

[a]Charged as a solid NaSH—H$_2$O solution containing 58.418 wt. % NaSH.

In each run the reactor was charged with NaOH, NaSH and 10.93–16.56 g-moles NMP. The reactor was sealed, agitation started and degassing accomplished by three pressurize-release cycles using nitrogen. The temperature of the reaction mixture was raised rapidly to 150° C. and the valve to the distillation condenser was opened. Approximately 375 mL of overhead was collected as the reaction mixture was heated from 160° C. to 200° C. during a total dehydration time of approximately 30 minutes. The reactor was sealed and a previously degassed solution of p-DCB in 3.36 g-moles NMP was pressured into the reactor using nitrogen. The valve between the charging vessel and the reactor was then closed.

The reaction mixture was heated to 235° C. and held there such that the ramp time and hold time totaled 30 minutes. The reaction mixture was then heated to 265° C. such that the total ramp time plus hold time was 45 minutes. The reaction mixture was then heated to 274° C. such that the total ramp time plus hold time was 60 minutes. Finally, to simulate a portion of the flash recovery process, the reaction mixture was heated to 282° C. and held for 45 minutes. The reaction mixture was then cooled.

The reaction mixture comprising PPS was washed with four hot water (approx. 90° C.) washes and rinsed with deionized water, and finally with acetone. The washed PPS was dried and samples tested for extrusion rate according to the method described above. The results obtained are presented in TABLE I below.

TABLE I

| Run No. | NMP (g-moles) | Molar Ratio NaSH/NMP[a] | Extrusion Rate g/10 min |
| --- | --- | --- | --- |
| 1[b] | 19.92 | 0.324 | 38.2 |
| 2[b] | 18.37 | 0.354 | 59.7 |
| 3[b] | 16.66 | 0.393 | 48.2 |
| 4[c] | 15.38 | 0.429 | 244 |
| 5[c] | 14.29 | 0.465 | 879 |

[a]Corrected for amount of NMP removed during the dehydration step.
[b]Control run.
[c]Invention run.

The results in TABLE I indicate that increasing the NaSH/NMP mole ratio to between 0.393 and 0.429 results in PPS having a dramatically increased extrusion rate.

EXAMPLE II

A series of polymerization runs were performed in a 90 gallon stirred (400 rpm) reactor for the preparation of PPS. The polymerization recipe for these runs is presented below.

|  | Compound, lb-mole |
| --- | --- |
| N—methyl-2-pyrrolidone (NMP) | 2.41–2.80 |
| Sodium hydroxide (NaOH)[a] | 0.9170–1.063 |
| Sodium bisulfide (NaSH)[b] | 0.9371–1.089 |
| p-Dichlorobenzene (p-DCB) | 0.9531–1.107 |

[a]Charged as an aqueous solution of 50.193 wt. % of NaOH.
[b]Charged as an aqueous solution of 60.059 wt. % NaSH and 0.457 wt. % Na$_2$S.

In each run the aqueous NaOH and aqueous NaSH were premixed in a separate vessel then the warmed (approx. 115° C.) liquid mixture charged with a following NMP flush to the reactor containing the remaining NMP. This mixture was then subjected to a dehydration step wherein water plus a small amount of NMP was removed from the reactor by distillation at a reflux ratio of 1:1. Withdrawal of overhead started at a reactor temperature of 167°–171° C. and ended at 231°–239° C. over a period of 79–91 minutes. The amount distilled overhead was 66.3–80.4 lbs.

Molten p-DCB was then charged to the reactor at 211°–219° C. and the reactor temperature increased at 0.56°–0.78° C./minute to 271°–274° C. in approximately 100 minutes. The reaction mixture was then held at 274° C. for 25 minutes. The reactor was vented for recovery of volatiles for 55–67 minutes to 70 psig, heated to 282° C. then the reactor contents transferred to another vessel wherein reduced pressure conditions caused the remaining NMP and other volatiles to be flashed overhead for recovery.

The recovered reaction mixture comprising PPS was washed once with ambient tap water, rinsed with hot (82° C.) water, washed once with deaerated water at 176° C. with a hot water rinse and given a final wash with deaerated water at 176° C. with a hot deionized or tap water rinse. The washing steps utilized a PPS slurry mixing tank and a nylon fabric filter cloth on a moving horizontal belt filter system to separate the PPS from the wash/rinse liquid. The washed PPS obtained from each run was dried and a sample tested for extrusion rate according to the method described above. The results obtained are presented in TABLE II below.

TABLE II

| Run No. | Reactor Charges, lb-moles | | | | Molar Ratio, NaSH/NMP | Unreacted p-DCB, lb-moles | Conversion of p-DCB, % | ER[e] |
| --- | --- | --- | --- | --- | --- | --- | --- | --- |
|  | NaOH | NaSH | NMP | p-DCB |  |  |  |  |
| 6[b,d] | 0.9170 | 0.9371 | 2.80 | 0.9531 | 0.335 | .0503 | 94.7 | 50 |
| 7[b] | 0.9299 | 0.9582 | 2.72 | 0.9746 | 0.352 | .0527 | 94.6 | 37 |
| 8[b] | 0.9754 | 1.004 | 2.63 | 1.022 | 0.382 | .0582 | 94.3 | 46 |
| 9[b] | 0.9744 | 1.005 | 2.63 | 1.021 | 0.382 | .0618 | 94.0 | 54 |
| 10[c] | 1.019 | 1.051 | 2.49 | 1.062 | 0.422 | .0550 | 94.8 | 60 |
| 11[c] | 1.020 | 1.051 | 2.49 | 1.062 | 0.422 | .0530 | 95.0 | 71 |
| 12[c] | 1.057 | 1.094 | 2.41 | 1.106 | 0.454 | .0588 | 94.7 | 154 |
| 13[c] | 1.056 | 1.088 | 2.41 | 1.107 | 0.451 | .0646 | 94.2 | 171 |
| 14[c] | 1.057 | 1.089 | 2.41 | 1.106 | 0.452 | .0614 | 94.4 | 143 |
| 15[c] | 1.056 | 1.088 | 2.41 | 1.100 | 0.451 | .0559 | 94.9 | 136 |

TABLE II-continued

| Run No. | Reactor Charges, lb-moles | | | | Molar Ratio, NaSH/NMP | Unreacted p-DCB, lb-moles | Conversion of p-DCB, % | ER[e] |
| --- | --- | --- | --- | --- | --- | --- | --- | --- |
| | NaOH | NaSH | NMP | p-DCB | | | | |
| 16[a,c,d] | 1.063 | 1.082 | 2.41 | 1.102 | 0.449 | .0449 | 95.9 | 105 |

[a]The polymerization time for this run was extended 180 minutes prior to the vent step to determine whether the polymerization was complete. The ER of samples taken before and after the extended hold were determined to be 121 and 113 respectively.
[b]Control run.
[c]Invention run.
[d]The NaOH was charged as an aqueous solution of 50.193 wt. % NaOH and the NaSH was charged as an aqueous solution of 58.977 wt. % NaSH and 0.317 wt. % Na$_2$S.
[e]Extrusion rate in g/10 min.

The results in TABLE II indicate that increasing the NaSH/NMP mole ratio to between about 0.42 and about 0.45 results in PPS having a dramatically increased extrusion rate. The results also indicate that the polymerization is essentially complete, as evidenced by the conversion of p-DCB, and that the increased extrusion rates are not the result of incomplete polymerizations.

EXAMPLE III

A series of polymerization runs were performed in a 2000 gallon stirred reactor for the preparation of PPS. The polymerization recipe for these runs is presented below.

| | Compound, lb-mole |
| --- | --- |
| N—methyl-2-pyrrolidone (NMP) | 65.07–78.14 |
| Sodium hydroxide (NaOH)[a] | 27.59–27.63 |
| Sodium bisulfide (NaSH)[b] | 27.31–27.36 |
| p-Dichlorobenzene (p-DCB) | 28.16–28.19 |

[a]Charged as an aqueous solution of 50.631 wt. % NaOH.
[b]Charged as an aqueous solution of 59.267 wt. % NaSH and 0.187 wt. % Na$_2$S.

In each run the aqueous NaOH and aqueous NaSH were premixed in a separate vessel then the warmed liquid mixture charged with a following NMP flush to a dehydration vessel containing enough NMP so that the mole ratio of NaSH/NMP was 0.65. This mixture was subjected to a dehydration step wherein water plus a small amount of NMP was removed from the dehydration vessel by distillation. Withdrawal of overhead was made for a period of 50–58 minutes with the final temperature being 219°–223° C. The dehydrated mixture was then transferred to the polymerization reactor followed by an NMP flush.

Molten p-DCB was then charged to the reactor and the reactor temperature increased from 210° C. to 232° C. at 1.1° C./minute. The temperature of the reaction mixture was then increased to 254° C. at 0.56° C./minute and subsequently increased to 274° C. at 0.72° C./minutes. The reaction mixture was then held at 274° C. about 25 minutes. The reactor was vented for recovery of volatiles, heated to 282° C. then the reactor contents transferred to another vessel wherein reduced pressure conditions caused the remaining NMP and other volatiles to be flashed overhead for recovery.

The recovered reaction mixture was washed and filtered. The washed PPS obtained from each run was dried and a sample tested for extrusion rate according to the method described above. The results obtained are presented in TABLE III below.

TABLE III

| Run No. | Reactor Charges lb-moles | | | | Molar Ratio, NaSH/NMP | Molar Ratio,[e] NaOH/NaSH | Extrusion Rate, g/10 min. |
| --- | --- | --- | --- | --- | --- | --- | --- |
| | NaOH | NaSH | NMP | p-DCB | | | |
| 17[b,d] | 27.62 | 27.35 | 78.14 | 28.17 | 0.35 | 1.009 | 41 |
| 18[b,d] | 27.63 | 27.35 | 78.14 | 28.19 | 0.35 | 1.014 | 52 |
| 19[b,d] | 27.63 | 27.36 | 72.0 | 28.18 | 0.38 | 1.012 | 45 |
| 20[b,d] | 27.63 | 27.35 | 71.97 | 28.18 | 0.38 | — | 54 |
| 21[b] | 27.59 | 27.31 | 68.28 | 28.18 | 0.40 | 1.013 | 61 |
| 22[b] | 27.63 | 27.31 | 68.28 | 28.16 | 0.40 | 1.015 | 65 |
| 23[b] | 27.61 | 27.34 | 68.35 | 28.18 | 0.40 | — | 100 |
| 24[c] | 27.61 | 27.34 | 65.10 | 28.17 | 0.42 | — | 119 |
| 25[c] | 27.63 | 27.34 | 65.10 | 28.18 | 0.42 | 1.017 | 112 |
| 26[c] | 27.62 | 27.34 | 65.10 | 28.18 | 0.42 | 1.010 | 130 |
| 27[a,c] | 27.62 | 27.34 | 65.10 | 28.18 | 0.42 | 1.010 | 184 |

[a]The polymerization time for this run was extended 5 hours at 254° C. prior to heating to 274° C.
[b]Control run.
[c]Invention run.
[d]The NaOH was charged as an aqueous solution of 50.633 wt. % NaOH and the NaSH was charged as an aqueous solution of 59.33 wt. % NaSH and 0.305 wt. % Na$_2$S.
[e]Determined by titration of a sample of the mixture of aqueous NaOH and aqueous NaSH solutions with 1N HCl in aqueous medium.

The results in TABLE III indicate that increasing the NaSH/NMP ratio to between 0.40 and 0.42 results in PPS having a dramatically increased extrusion rate.

That which is claimed is:

1. A process for preparing arylene sulfide polymers having an extrusion rate of at least about 100 g/10 min. comprising the steps of:
   (a) dehydrating an aqueous admixture comprising at least one sulfur source and at least one cyclic organic amide thereby forming a dehydrated admixture;
   (b) admixing at least one dihalo-substituted aromatic compound with said dehydrated admixture to produce a polymerization mixture wherein the molar ratio of sulfur source to said cyclic organic amide is 0.42:1 to 0.465:1;
   (c) subjecting said polymerization mixture to polymerization conditions effective to produce products comprising said arylene sulfide polymer; and
   (d) recovering said arylene sulfide polymer.

2. A process according to claim 1 wherein said aqueous admixture in step (a) further comprises an alkali metal hydroxide.

3. A process according to claim 1 wherein said sulfur source comprises an alkali metal sulfide.

4. A process according to claim 2 wherein said sulfur source is selected from the group consisting of alkali metal bisulfides and hydrogen sulfide.

5. A process according to claim 3 wherein said cyclic organic amide is selected from the group consisting of N,N'-ethylenedipyrrolidone, N-methyl-2-pyrrolidone, pyrrolidone, caprolactam, N-ethylcaprolactam, N-methylcaprolactam, and mixtures thereof and wherein said alkali metal sulfide comprises sodium sulfide.

6. A process according to claim 4 wherein said sulfur source comprises an alkali metal bisulfide, said alkali metal hydroxide comprises sodium hydroxide, and said cyclic organic amide is selected from the group consisting of N,N'-ethylenedipyrrolidone, N-methyl-2-pyrrolidone, pyrrolidone, caprolactam, N-ethylcaprolactam, N-methylcaprolactam, and mixtures thereof.

7. A process according to claim 6 wherein said cyclic organic amide comprises N-methyl-2-pyrrolidone, and wherein said dihalo-substituted aromatic compound is selected from the group consisting of p-dichlorobenzene and mixtures of p-dichlorobenzene with a total of about 0 to about 10 mole percent of at least one of m-dichlorobenzene, o-dichlorobenzene, and alkyl-substituted p-dichlorobenzene having the formula

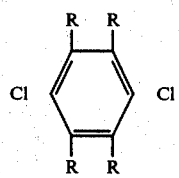

wherein R is H or an alkyl group having 1-4 carbon atoms and at least one R is not H.

8. A process according to claim 7 wherein said alkali metal bisulfide comprises sodium bisulfide and said dihalo-substituted aromatic compound comprises p-dichlorobenzene.

9. A process according to claim 5 wherein said cyclic organic amide comprises N-methyl-2-pyrrolidone, and said dihalo-substituted aromatic compound is selected from the group consisting of p-dichlorobenzene and mixtures of p-dichlorobenzene with a total of about 0 to about 10 mole percent of at least one of m-dichlorobenzene, o-dichlorobenzene, and alkyl-substituted p-dichlorobenzene having the formula

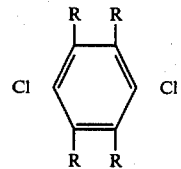

wherein R is H or an alkyl group having 1-4 carbon atoms and at least one R is not H.

10. A process according to claim 9 wherein said dihalo-substituted aromatic compound comprises p-dichlorobenzene.

11. A process according to claim 10 wherein said alkali metal sulfide comprises sodium sulfide and said arylene sulfide polymer has an extrusion rate of at least about 100 to about 1000 g/10 min.

12. A process according to claim 8 wherein said arylene sulfide polymer has an extrusion rate of at least about 100 to about 1000 g/10 min.

* * * * *